May 16, 1967  J. C. LOCKLAIR, JR  3,320,510
FREQUENCY REGULATED INVERTER
Filed April 27, 1964
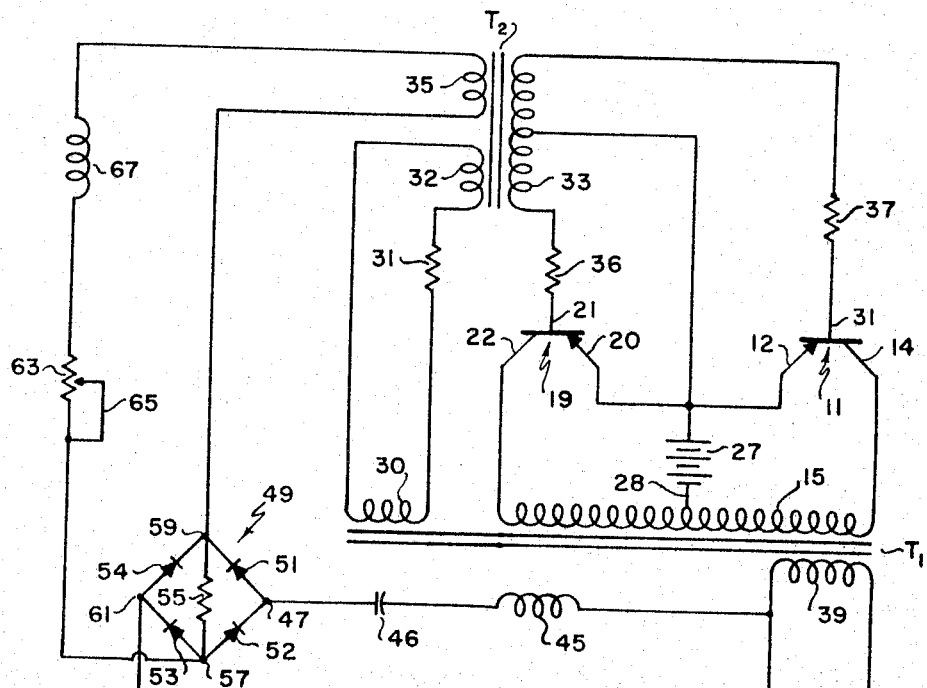
FIG. 1.
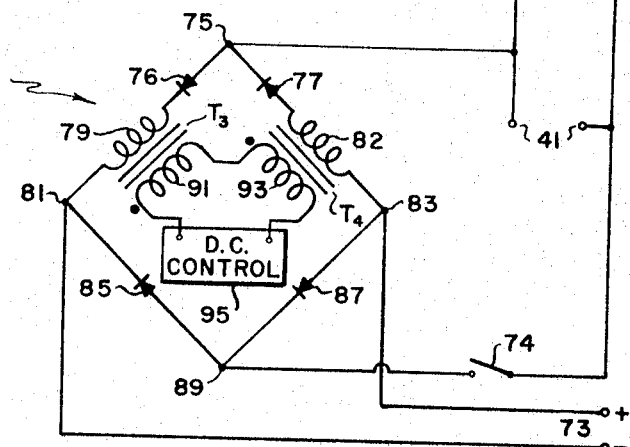
FIG. 2.
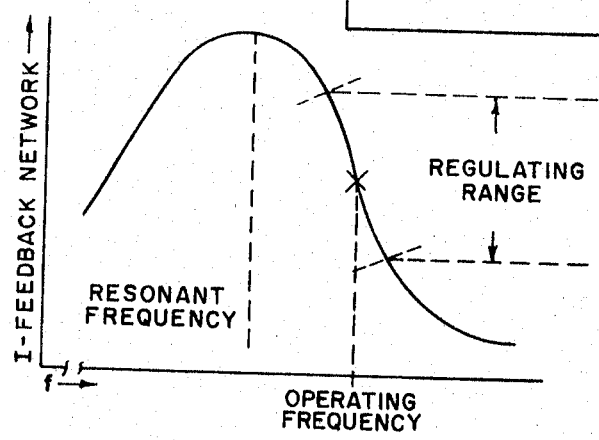
INVENTOR.
JOHN C. LOCKLAIR, JR.
BY
ATTYS.

United States Patent Office 3,320,510
Patented May 16, 1967

3,320,510
FREQUENCY REGULATED INVERTER
John C. Locklair, Jr., Anne Arundel County, Md., assignor to the United States of America as represented by the Secretary of the Navy
Filed Apr. 27, 1964, Ser. No. 363,031
6 Claims. (Cl. 321—2)

The invention described herein may be manufactured and used by or for the Government of the United States of America for governmental purposes without the payment of any royalties thereon or therefor.

The present invention relates to inverters and more particularly to inverters which are provided with automatic frequency control.

Inverters are utilized for converting a source of direct current to alternating current, or alternatively for converting a source of direct current of a first voltage level to an alternating current voltage of a second voltage level and thence again into a direct current voltage. The prior art inverters which utilize chemical batteries as voltage source generally operate satisfactorily, however, generally the voltage of the chemical batteries utilized for voltage sources, decrease as the batteries age with the resulting frequency shift of the alternating current voltage. In some of the prior art inverters, the voltage level of the output varies due to the above mentioned aging of the batteries and to temperature effects on the batteries.

One of the problems of the prior art inverters utilizing substantially identical saturable transformers was that they had different operational frequency due to inherent variations in core material. The prior are solved this problem by adjusting the number of turns of the saturable transformer windings to obtain the desired frequency response.

The present invention cures the aforementioned defects by utilizing a feedback network for automatically controlling the frequency of the alternating current generated by the inverter.

An object of the present invention is to provide an inverter which has a substantially constant frequency output as the voltage of the direct current source changes with age.

A further object of the invention is to provide an inverter which has a substantially constant level of output voltage.

Another object of the present invention is to provide an inverter which has provisions for an alternating current output and a direct current output.

Still another object of the invention is the elimination of the adjustments of the saturable transformer necessitated by variations in core material in inverters designed to operate at a given frequency.

Other objects and many of the attendant advantages of this invention will be readily appreciated as the same becomes better understood by reference to the following detailed description when considered in connection with the accompanying drawings wherein:

FIG. 1 is a circuit diagram of a frequency regulated inverter in accordance with the invention;

FIG. 2 is a graph illustrating the range of frequency regulation obtained with the circuit illustrated in FIG. 1.

The circuit of FIG. 1 comprises a first transistor 11 having an emitter electrode 12, a base electrode 31, and a collector electrode 14 connected to one end of primary winding 15 of transformer $T_1$. A second transistor 19 having an emitter electrode 20, a base electrode 21, and a collector electrode 22 connected to the other end of primary winding 15 of transformer $T_1$. The emitter electrode 12 of transistor 11 is connected to a common junction point 25. Battery 27 has its negative terminal connected to the center tap 28 of the primary winding 15 of output transformer $T_1$ and its positive terminal connected to the common junction point 25. The emitter electrode 20 is connected to the common junction point 25. A secondary feedback winding 30 of transformer $T_1$ is connected to one end of resistor 31. The other end of resistor 31 is connected to one end of primary winding 32 of transformer $T_2$ and the other end of winding 32 of transformer $T_2$ is connected to the free end of feedback winding 30 of transformer $T_1$. One end of secondary winding 33 of transformer $T_2$ is connected via resistor 36 to the base electrode 21 of transistor 19. The other end of secondary winding 33 is connected via resistor 37 to the base electrode 31 of transistor 11.

Transformer $T_1$ is provided with an output secondary winding 39 having a pair of terminals 41 connected thereto. A resonant circuit comprising an inductor 45 and a capacitor 46 connected in series. The free end of inductor 45 is connected to one end of winding 39 and the free end of the capacitor 46 is connected to point 47 of a rectifying bridge 49. The anodes of diodes 52 and 53 are connected together at junction point 57 and the cathode of diode 51 and 54 are connected together at junction point 59. The cathode of diode 52 is connected to the anode of diode 51 at junction point 47. The anode of diode 54 is connected to the cathode of diode 53 at the junction point 61. A load resistor 55 for the bridge 49 is connected between the junction point 57 and the junction point 59. The junction point 61 of the rectifier bridge 49 is connected to the other end of secondary winding 39 of transformer $T_1$. A variable resistor 63 contains an adjustable wiper arm 65 for varying its resistance which varies the frequency of operation of the inverter. One end of the resistor 63 is connected to the junction point 57 of the rectifying bridge 49. The other end of the resistor 63 is connected to one end of a choke coil 67. The other end of choke coil is connected to one end of secondary winding 35 of transformer $T_2$. The other end of the secondary winding 35 of transformer $T_2$ is connected to the junction point 59 of the rectifying bridge 49.

An alternating current voltage may be obtained from output terminals 41. A full wave magnetic amplifier 71 is provided for producing a control amount of direct current on output terminal 73. A switch 74 is provided for eliminating the magnetic amplifier as a load on the inverter of a direct current source is not required. Junction point 75 is connected to one end of the secondary winding 39 of transformer $T_1$. The anode of diode 76 and the cathode of diode 77 are connected to the junction point 75. The cathode of diode 76 is connected to one end of the power winding 79 of a saturable transformer $T_3$. The other end of power winding 79 is connected to a junction point 81 which is connected to one of the output tetrminals 73. The anode of diode 77 is connected to one end of a power winding 82 of saturable transformer $T_4$. The other end of the power winding 82 is connected to a junction point 83 which is connected to the other output terminal 73. The cathode of diode 87 is connected to junction point 85 and the anode of diode 85 is connected to the junction point 89. The junction point 89 is connected to one end of switch 74. The other end of the switch 74 is connected to the other end of the primary winding 39 of transformer $T_1$. The saturable transformer $T_3$ has a control winding 91 which has one end connected to the control winding 93 of saturable transformer $T_4$. The free ends of windings 91 and 93 are connected to the source of D.C. control voltage 95 which controls the amount of current supplied to terminals 73.

The operation of the circuit of FIG. 1 will be described in conjunction with the graph illustrated in FIG. 2. Assuming for the purpose of explanation that transistor 11 is conductive and that transistor 19 is not conductive then transistor 11 causes current to flow in transformer $T_1$ so as to produce a voltage of a first polarity in the secondary winding 30. This first voltage is supplied to winding 32 of transformer $T_2$ for saturating transformer $T_2$ in a first direction. Transistor 11 remains conductive while transformer $T_2$ is saturating due to the polarity of the voltage developed on winding 33 of transformer $T_2$. However, when transformer $T_2$ becomes fully saturated transistor 11 becomes nonconductive. As the magnetomotive force falls from a value sufficient to effect saturation of the transformer $T_2$, the polarity of the voltage developed on winding 33 causes transistor 19 to become conductive producing a voltage of a second polarity in winding 30 of transformer $T_1$ which is opposite to the voltage of the first polarity generated in winding 30. This second voltage is supplied to winding 32 of transformer $T_2$ for saturating transformer $T_2$ in a second direction which is opposite to the first direction. When transformer $T_2$ becomes fully saturated in the second direction then transistor 19 becomes nonconductive. As the magnetomotive force falls from a value sufficient to effect saturation of the transformer $T_2$ in the second direction, then the polarity of the voltage developed on winding 33 causes transistor 11 to become conductive.

Frequency regulation is obtained by portion of the output current and passing the current through a series resonant circuit. The amount of feedback current passed by the series resonant circuit is dependent on the frequency of the feedback current being passed through the resonant circuit. In the present circuit configuration (see FIG. 2) the resonance point of the series resonant circuit is set at a lower frequency than the operating point of the inverter circuit. Therefore, as the frequency of operation of the inverter increases the amount of feedback current is reduced and conversely as the frequency of operation of the inverter decreases the amount of feedback current increases. The feedback current which is passed by the series resonant circuit is rectified in the bridge rectifying circuit 49. The rectified feedback current is then passed through a variable resistance for further controlling the amount of the current supplied to the control winding 35. A choke coil 67 is provided in order to block the A.C. ripple present in the feedback circuit. The feedback circuit supplied to the winding 35 determines the amount of additional current necessary to saturate the saturable transformer $T_2$. Another way of stating what happens is that the feedback current in winding 35 reduces (or squashes) the hysteresis curve of the saturable transformer $T_2$. The time necessary for the saturable transformer $T_2$ to saturate and hence the frequency of operation of the inverter is directly dependent on the amount of additional current necessary to saturate the transformer $T_2$. The greater the additional amount of current required, the longer it takes to saturate the transformer $T_2$ and hence the lower the frequency of operation of the inverter.

However, it is to be noted that the resonant frequency of the series resonant circuit can be made to be larger than the intended frequency of operation of the inverter. In this embodiment an additional source of current for example, a battery, is connected in series with the rectifying network such that the polarity of the battery is opposite to the polarity of the rectifying network.

The saturation control current is dependent on the difference of the battery potential and the potential generated by the rectifying network. In addition the potential of the battery should be larger than the potential generated by the rectifying bridge to assure saturation control at all times.

An alternating current signal of an accurately controlled predetermined frequency is obtained from terminals 41. In addition a controlled amount of direct current is obtained at terminals 73 when switch 74 is closed and a direct current control signal is present on control windings 91 and 93 of the magnetic amplifier. Specifically a maximum negative control signal delivers the minimum output current at terminals 73 and a maximum positive control signal delivers the maximum output current at terminals 73.

As an example, the components and their respective value or types in an arrangement according to a version of the present invention which has been built are listed below.

Resistor:
| | | |
|---|---|---|
| 31 | ohms | 10 |
| 36 | do | 10 |
| 37 | do | 10 |
| 55 | do | 5100 |

Capacitor:
| | | |
|---|---|---|
| 46 | mf | 5 |

Coil:
| | | |
|---|---|---|
| 45 | mh | 400 |
| 67 | mh | 53 |

Transistor:
| | |
|---|---|
| 12 | 2N297A |
| 19 | 2N297A |

Diodes:
| | |
|---|---|
| 51 | 1N91 |
| 52 | 1N91 |
| 53 | 1N91 |
| 54 | 1N91 |
| 76 | 1N91 |
| 77 | 1N91 |
| 85 | 1N91 |
| 87 | 1N91 |

Obviously many modifications and variation of the present invention are possible in the light of the above teachings. It is therefore to be understood that within the scope of the appended claims the invention may be practiced otherwise than as specifically described.

What is claimed is:
1. A frequency regulated inverter comprising:
 a first electronic valve having an input and an output;
 a second electronic valve having an input and an output;
 a saturable transformer having a first, second and third windings, said first winding of said saturable transformer having one end connected to said input of said first electronic valve and the other end connected to said input of said second electronic valve;
 an output transformer having a first, second and third windings, said first winding having one end connected to said output of said first electronic valve and the other end of said winding connected to said output of said second electronic valve, said second winding of said saturable transformer connected in series with said second winding of said output transformer and forming a circuit path;
 a series resonant circuit having one end connected to one end of said third winding of said output transformer; and
 a bridge rectifier network having a first, second, third and fourth junction point, said first bridge rectifier network junction point connected to the other end of said resonant circuit and said second bridge rectifier network junction point connected to the other end of said third winding of said output transformer, one end of said third winding of said saturable transformer connected to said third bridge rectifier network junction point, and said other end of said third winding of said saturable transformer connected to said fourth bridge rectifier network junction point.

2. A frequency regulated inverter as defined in claim 1 but further characterized by having said first electronic valve comprising a transistor and said second electronic valve comprising a transistor.

3. A frequency regulated inverter as defined in claim 1 but further characterized by having a rectifier network coupled to the third winding of said output transformer for supplying a rectified output current and means connected to said rectifier network for controlling the amount of output current.

4. A frequency regulated inverter as defined in claim 3 but further characterized by having said first electronic valve comprising a transistor and said second electronic valve comprising a transistor.

5. A frequency regulated inverter as defined in claim 3 but further characterized by having a frequency controlling means and a ripple suppressing means connected in series with said third winding of said saturable transformer.

6. A frequency regulated inverter as defined in claim 5 but further characterized by having said first electronic valve comprising a transistor and said second electronic valve comprising a transistor.

References Cited by the Examiner

UNITED STATES PATENTS

| | | | |
|---|---|---|---|
| 2,839,684 | 6/1958 | Smith-Vaniz | 331—361 X |
| 2,903,639 | 9/1959 | Meszaros | 321—18 |
| 3,183,432 | 5/1965 | Pintell | 331—113.1 X |

JOHN F. COUCH, *Primary Examiner.*

W. H. BEHA, *Assistant Examiner.*